United States Patent

De Keyzer et al.

[11] Patent Number: 5,157,527
[45] Date of Patent: Oct. 20, 1992

[54] DEVICE COMPRISING A COLOR FILTER AND TOP COAT

[75] Inventors: Gerardus C. M. De Keyzer; Antonius H. M. Raaijmakers; Petrus E. M. Baltussen; Henricus G. J. A. M. Luijben, all of Eindhoven, Netherlands

[73] Assignee: U.S. Philips Corporation, New York, N.Y.

[21] Appl. No.: 655,007

[22] Filed: Feb. 12, 1991

[30] Foreign Application Priority Data

Feb. 19, 1990 [NL] Netherlands ............... 9000389

[51] Int. Cl.⁵ .................................. G02F 1/13
[52] U.S. Cl. ............................ 359/66; 359/74; 427/385.5
[58] Field of Search ............. 359/66, 74, 62; 427/44, 427/54.1, 372.2, 385.5; 430/197

[56] References Cited

U.S. PATENT DOCUMENTS

| | | | |
|---|---|---|---|
| 4,118,110 | 10/1978 | Saurer et al. | 359/62 |
| 4,422,727 | 12/1983 | Baeger et al. | 359/74 |
| 4,529,272 | 7/1985 | Krüger et al. | 359/74 |
| 4,744,637 | 5/1988 | Sekimura et al. | 359/66 |
| 4,779,957 | 10/1988 | Suginoya et al. | 359/74 |
| 4,820,619 | 4/1989 | Sanada et al. | 430/197 |
| 5,045,418 | 9/1991 | Fukuyoshi | 359/87 |

Primary Examiner—Stanley D. Miller
Assistant Examiner—Huy K. Mai
Attorney, Agent, or Firm—Norman N. Spain

[57] ABSTRACT

Top coat (4, 6) for a color filter (3) which is hard enough to resist the pressure of spacers (13) and whose edges (6) are slanted in such a way that a satisfactory step coverage is possible, formed by means of a flexographic pressing method, is a cured acrylic resin.

17 Claims, 1 Drawing Sheet

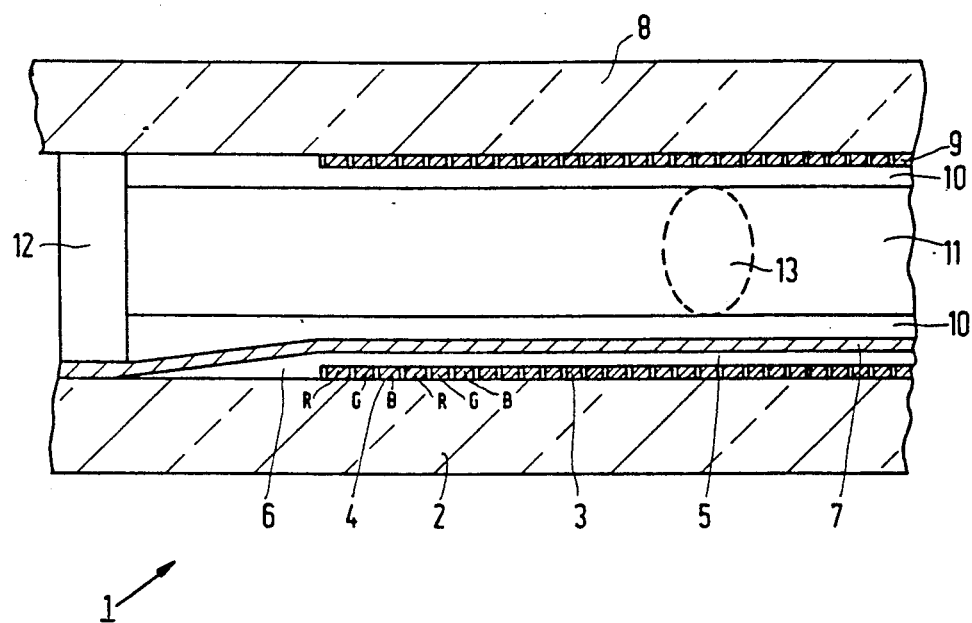

DEVICE COMPRISING A COLOR FILTER AND TOP COAT

BACKGROUND OF THE INVENTION

The invention relates to a device comprising a substrate provided with a color filter which is at least partly coated with a top coat.

The invention also relates to a method of manufacturing such a device.

A color filter as mentioned above may be used in electrooptical display devices such as, for example, a liquid crystal display device, but also, for example in charge-coupled devices for picking up pictures, etc. Such a color filter usually comprises a pattern of color pixels, but it may also comprise a so-called "black matrix".

A device of the type described in the opening paragraph is used for example in a liquid crystal display device as described in U.S. Pat. No. 4,744,637. This Patent describes a top coat which is less sensitive to UV radiation than the top coat which has hitherto been conventional and which has such a thermal coefficient of expansion that it is hardly roughened or undulated when electrodes are subsequently provided. Satisfactory results were notably achieved with a top coat comprising $SiO_2$, whereas there was a considerable roughening if acrylic photosetting resins were used.

Particularly when used in liquid crystal display devices, this type of top coat must satisfy a number of requirements.

For example, the top coat must be resistant to subsequent manufacturing steps, for example, the formation of transparent conducting tracks such as indium tin oxide. The top coat should be both resistant to the etching materials used. In addition, there should be no undulation of the top coat and/or color filter at the temperatures used. Temperatures used in the deposition of indium tin oxide are preferably chosen to be relatively high (180°-200°) because the ultimate resistivity of the resulting conducting tracks is then minimal.

Furthermore, the top coat should preferably not extend beyond the actual display portion because other connection tracks may already be present in the peripheral at that areas on the substrate, for example, to provide chip-on-glass connections. It is therefore advantageous if the top coat can be patterned. However, the top coat should not cease abruptly because ruptures may then occur in the overlaping conductor tracks of the top coat.

Moreover, said top coat should be resistant to indentation by spacers which are employed to maintain the thickness of the liquid crystal layer.

In this respect it is to be noted that the use of a top coat comprising a thermosetting acrylic resin is known per se from EP-A-0,266,218. However, no mention is made of slanting edges.

Patterning top coats is possible with, for example, epoxy and polyimide resins, but the layers produced thereby are so soft that they may be damaged by pressure of the spacers or they may be subject to a certain amount of indentation, which is position-dependent, resulting in thickness variations of the liquid crystal layer. Moreover, such layers are often less resistant to said subsequent process steps such as the formation of electrodes (temperature, etching liquid).

It is one of the objects of the invention to provide a top coat which satisfies the above requirements as satisfactorily as possible.

To this end, a device according to the invention is characterized in that the top coat comprises a cured acrylic resin and gradually decreases in thickness toward at least one of its edges.

The invention is based on the recognition that it is possible to provide such a hard, scratch-resistant top coat of polymerizable resin(s) by making use of flexographic pressing techniques or, for example, stamping techniques.

The top coat decreases in thickness towards its edge preferably with a slope which is smaller than 30°; in practice, slopes of 1° to 2° can be realised.

The top coat outside the color filter area may locally have a variation in its angle of inclination which may even extend in slightly opposite directions, dependent on the substrate and process parameters, although this oppositely varying slope is substantially always 2° or less.

Said top coat, which is manufactured by polymerization of an acrylic resin, preferably has a pencil hardness of at least 4 H. The acrylic resins formed from an acrylate selected from the group consisting of trimethylol propane triacrylate, pentaerithytol triacrylate and pentaerithytol teteracrylate and n-vinyl pyrrolidone can be used for this purpose.

The substrate which is provided with a top coat may also be used in electro-optical display devices other than liquid crystal display devices.

A method of manufacturing a device according to the invention is characterized in that, after the substrate has been subjected to a cleaning step, it is provided with the top coat material at the area of the color filter, which top coat is patterned, whereafter the top coat material is cured by means of UV radiation.

The cleaning step may be an oxygen plasma treatment or a UV ozone treatment.

The material can be patterned by making use of a flexographic pressing method or a stamp.

After the material has been patterned, a waiting time of 5 to 10 minutes is observed before the material is cured, which preferably takes place in an inert atmosphere.

These and other aspects of the invention will now be described in greater detail and explained with reference to an embodiment and the drawing.

BRIEF DESCRIPTION OF THE DRAWING

The single figure shows diagrammatically in cross-section a part of a display device according to the invention.

DESCRIPTION OF THE PREFERRED EMBODIMENTS

FIG. 1 shows diagrammatically a part of a display device 1 having a first supporting plate 2 of glass, quartz or another suitable material. A color filter 3, in this example comprising color cells 4 (red$^{(r)}$, green$^{(g)}$, blue$^{(b)}$), corresponding to pixels is provided on the supporting plate 2 by methods which are conventional in liquid crystal technology. Moreover, the color filter may comprise a so-called "black matrix" of a light-absorbing material between the cells, to enhance display contrast.

The color filter 3 is provided with a top coat 5 which according to the invention consists of a polymerized acrylic resin and gradually decreases in thickness at the areas of the edges (areas 6), for example with a slope of 1° to 2°. The manufacture of such a top coat will hereinafter be described in greater detail.

The top coat 5 is provided with a metallization pattern 7 consisting of, for example, transparent indium tin oxide (ITO) electrodes. Before the metallization pattern is provided a thin layer of $SiO_2$ (not shown) is deposited on the top coat 5. In a device according to the invention, indium tin oxide can be deposited (and annealed if necessary) at a comparatively high temperature without undulation or roughening of the top coat 5. Such a high deposition temperature leads to ITO electrodes having a very low resistance. Furthermore, etching baths suitable for patterning the ITO layer do not attack the top coat 5.

The device further comprises a second supporting plate 8 on which electrodes 9 are provided which define pixels, either because the electrodes 9 and the metallization pattern 7 constitute a cross-bar system in which the crossings define the pixels (passive drive), or because the electrodes 9 constitute picture electrodes which are driven by a system (not shown) of switching elements, drive and data lines (active drive); in the latter case the electrode 7 may have an unpatterned single layer structure.

A layer of liquid crystal material 11 is present between the two supporting plates 2, 8 which, if necessary, are provided with protective/orienting layers 10. The two supporting plates are held at a substantially constant distance from each other by means of a sealing edge 12 and spacers 13. The device may be further provided with polarizers, reflectors, etc. in the conventional manner.

At the area of the edge (area 6) the top coat gradually decreases in thickness so that the metallization 7 can be provided at this area without any risk of breakage due to poor step coverage.

Since the top coat 5, 6 according to the invention is hard (and thus scratch-resistant), there is no risk of identation of this layer at the area of spacers 13.

The top coat 5, 6 may be manufactured as follows. The substrates material is, for example, a glass plate on which the color filter 4 and, if desired, all other metallization tracks outside the actual display portion, for example for chip-on-glass assembly, are provided. To ensure a satisfactory contact of these other metallization tracks, it is desirable to pattern the top coat 5, 6.

For a satisfactory adhesion of the top coat, substrate 2 and color filter 3 are cleaned in advance by for example, a short oxygen plasma treatment (10-20 seconds), but a UV/ozone treatment (0.5-10 minutes) is alternatively possible.

The top coat pattern 5 is subsequently provided by a flexographic pressing method. The material to be pressed, acrylic resin, is provided on the glass plate via a rubber plate having the desired pattern. The acrylic resin (for example trimethylol propane triacrylate) comprises monomers and dimers in such a ratio that this material has the correct viscosity to be pressed. To render the flexographic pressing method possible, no use is made of solvents. Possible auxiliary materials may, however, be added (surfactants, UV initiator).

A stamp instead of the rubber plate may be used alternatively.

The maximum layer thickness immediately after pressing is 0.5 to 3 micrometers.

Subsequently the layer is left free for a short time (5 to 10 minutes), causing it to flow freely to a slight extent, which results in the slanting portions 6. Finally the layer 5, 6 is cured by UV radiation in the absence of oxygen. The presence of oxygen would lead to softening of the layer 5, 6 due to a reduced polymerization and cross-linking of the polymers, with all the above-mentioned drawbacks. The acrylic resin thus obtained is found to be satisfactorily resistant to subsequent process steps of manufacturing the display device (high temperatures, pressing, various etching liquids).

The invention is of course not limited to the example described, but several variations are possible. For example, other display devices which are not based on liquid crystal effects can be provided on such a substrate, while the top coat can also be used on other color filters, for example for CCDs.

We claim:

1. A device comprising a substrate provided with a color filter, at least part of the surface of which filter is provided with a top coating, said top coating comprising a cured acrylic resin and having a thickness which gradually decreased outwardly from said filter from the area of an edge of said filter.

2. An electro-optical device comprising a substrate provided with a color filter, at least part of the surface of which filter is provided with a top coating, said top coating comprising a cured acrylic resin and having a thickness which gradually decreases outwardly from said filter from the area of an edge of said filter and said device comprising a display medium provided between two supporting plates, one of said supporting plates being said substrate.

3. A device as claimed in claim 2, characterized in that the top coat decreases in thickness with a slope of at most 30°.

4. A device as claimed in claim 3, characterized in that the slope is smaller than 5°.

5. A device as claimed in claim 2, characterized in that the top coat has a pencil hardness of at least 4 H.

6. A device as claimed in claim 2, characterized in that the top coat is substantially free from solvents for the acrylic resin.

7. A display device as claimed in claim 2, characterized in that the display medium comprises a liquid crystalline material.

8. A device as claimed in claim 3, characterized in that the top coat has a pencil hardness of at least 4 H.

9. A device as claimed in claim 4, characterized in that the top coat has a pencil hardness of at least 4 H.

10. A device as claimed in claim 3, characterized in that the top coat is substantially free from solvents for the acrylic resin.

11. A device as claimed in claim 4, characterized in that the top coat is substantially free from solvents for the acrylic resin.

12. A device as claimed in claim 5, characterized in that the top coat is substantially free from solvents for the acrylic resin.

13. An electro-optical device as claimed in claim 2 wherein the acrylic resin is formed from an acrylate selected from the group consisting of trimethylol propane triacrylate, pentaerythritol triacrylate and pentaerythrytol tetraacrylate and n-vinyl pyrrolidone.

14. An electro-optical device as claimed in claim 3 wherein the acrylic resin is formed from an acrylate selected from the group consisting of trimethylol propane triacrylate, pentaerythritol triacrylate and pentaerithrytol tetraacrylate and n-vinyl pyrrolidone.

15. An electro-optical device as claimed in claim 4 wherein the acrylic resin is formed from an acrylate selected from the group consisting of trimethylol propane triacrylate, pentaerythritol triacrylate and pentaerithrytol tetraacrylate and n-vinyl pyrrolidone.

16. An electro-optical device as claimed in claim 5 wherein the acrylic resin is formed from an acrylate selected from the group consisting of trimethylol propane triacrylate, pentaerythritol triacrylate and pentaerithrytol tetraacrylate and n-vinyl pyrrolidone.

17. An electro-optical device as claimed in claim 6 wherein the acrylic resin is formed from an acrylate selected from the group consisting of trimethylol propane triacrylate, pentaerythritol triacrylate and pentaerithrytol tetraacrylate and n-vinyl pyrrolidone.

* * * * *